United States Patent [19]

Novak

[11] Patent Number: 4,866,835
[45] Date of Patent: Sep. 19, 1989

[54] STORAGE AND TRANSPORTATION UNIT FOR MACHINE TOOLS

[75] Inventor: Peter Novak, Te,uml/a/ gerwilen, Switzerland

[73] Assignee: Starrfraschmachinen AG, Rorschacherberg, Switzerland

[21] Appl. No.: 115,761

[22] Filed: Oct. 30, 1987

[30] Foreign Application Priority Data

Nov. 3, 1986 [CH] Switzerland ............ 4346/86

[51] Int. Cl.⁴ .................................... B23Q 3/157
[52] U.S. Cl. ................................ 229/568; 211/1.5
[58] Field of Search ............... 29/568, 26.A; 211/1.5

[56] References Cited

U.S. PATENT DOCUMENTS

| | | |
|---|---|---|
| 3,780,423 | 12/1973 | Lilienthal et al. ............ 29/568 |
| 4,545,107 | 10/1985 | Bellman et al. ............ 29/568 |
| 4,577,389 | 3/1986 | Shultz ............ 29/568 |
| 4,658,493 | 4/1987 | Saeki et al. ............ 29/568 |
| 4,783,902 | 11/1988 | Novak ............ 29/568 |

FOREIGN PATENT DOCUMENTS

| | | |
|---|---|---|
| 2135240 | 1/1972 | Fed. Rep. of Germany . |
| 2140214 | 3/1973 | Fed. Rep. of Germany . |
| 2703367 | 8/1978 | Fed. Rep. of Germany . |
| 3022717 | 1/1982 | Fed. Rep. of Germany ........ 29/568 |
| 3146452 | 6/1983 | Fed. Rep. of Germany . |
| 3217728 | 11/1983 | Fed. Rep. of Germany . |
| 85201235 | 11/1985 | Fed. Rep. of Germany . |
| 2382828 | 11/1978 | France ............ 211/1.5 |
| 2543467 | 10/1984 | France ............ 29/568 |
| 226502 | 8/1985 | German Democratic Rep. ... 29/568 |
| 50733 | 3/1986 | Japan ............ 29/568 |
| 1428357 | 3/1976 | United Kingdom ............ 29/568 |

OTHER PUBLICATIONS

"Flexible Workshop", pp. 55-61; Mach'Pro; Apr. 29, 1986.

Primary Examiner—William Briggs
Attorney, Agent, or Firm—Helfgott & Karas

[57] ABSTRACT

A mobile storage and transportation unit for machine tools employing a frame rack having at least one frame, the frame being provided with at least one chassis engaging device. The unit also employs a plurality of elongated tool storage magazines, each magazine having an elongated front face and an opposite elongated rear face and having opposite ends. The front face of each magazine is adapted to removably receive and store a plurality of tools in adjacent side by side positions, the tools being disposed along a common row. The unit also employs a like plurality of chassis, each chassis being secured to the rear face of a corresponding one of the magazines adjacent a corresponding one of the two opposite ends thereof. All of the chassis engage the chassis engaging device to suspend the magazines in parallel abutting position on the frame.

18 Claims, 4 Drawing Sheets

STORAGE AND TRANSPORTATION UNIT FOR MACHINE TOOLS

CROSS REFERENCE TO COPENDING APPLICATION

This application is related to copending application Ser. No. 115,770 filed on even date herewith and entitled TOOL STORE FOR MACHINE TOOLS AND METHOD FOR THE OPERATION THEREOF.

BACKGROUND OF THE INVENTION

The present invention relates to a storage and transportation unit for receiving machining tools for machine tools particularly machining centres. The unit is mobile and can be used to store the machining tools inside and outside the machine tools and also for transporting the machining tools to and from the machine tools.

It is necessary when machine tools, particularly numerically controlled machine tools and machining centres are in use to make the tools required for machining the workpieces available in such a way that a machining sequence is ensured with a minimum of idle time. Accordingly it is known to house the tools in a tool store associated with the machine tools, from where they can be inserted into the machine tool in a predetermined program sequence using a handling device and following use can be returned to the store.

Each tool store has a specific storage capacity depending upon its design and construction. The number of tools housed therein is normally sufficiently large that the number of tools is adequate for machining a large number of workpieces. However, cases constantly arise where the number of machining tools is not sufficient and therefore additional tools must be used. The latter can be made available in different ways, e.g. by replacing individual tools within the tool store either manually or by means of a loading and unloading arm, or by a partial or complete replacement of the tools in the tool store.

However, an at least partial new occupancy of the tool locations within a tool store is also necessary when the need arises for machining a new workpiece.

The tools are generally centrally stored, where they are prepared and brought together. For transportation to the machine tools use is made of transportation units, in which the tools are arranged in a specific sequence. The tools are brought by means of these transportation units to the individual machine tools and the transportation units can also serve as storage units.

However, it is still desirable to make the storage capacity of the tool store associated with the machine tool sufficiently large that virtually all the machining operations for a workpiece which occur can be performed without any further tool change. However, in the known tool stores considerable effort and expenditure are involved in increasing the storage capacity. In the case of disk magazines, several disks are superimposed, whereas in the case of chain magazines parallel chains are juxtaposed. Another solution comprises loading the store by using a portal loader. Although these measures lead to an increase in the storage capacity, they either involve a considerable additional time and space requirement and/or involve a complicated construction.

In the aforementioned copending application, Ser. No. 115,770 which has been allowed, a tool store is described, which has a high storage capacity, the rapid tool change being achieved by different means and in the sense of supplementing the present invention, reference is made to said application. One of these means is the use of a tool magazine as a support for a plurality of tools.

SUMMARY OF THE INVENTION

It is an object of the present invention to provide a new and improved storage and transportation unit which can not only be used for the transportation and storage of tools, but also can be used as an additional store for a tool store according to the aforementioned patent and which is also usable for other tool stores.

In accordance with the principles of the invention a mobile storage and transportation unit for machine tools employs a frame rack having at least one frame, the frame being provided with at least one chassis engaging means. The unit also employs a plurality of elongated tool storage magazines, each magazine having an elongated front face and an opposite elongated rear face and having opposite ends. The front face of each magazine is adapted to removably receive and store a plurality of tools in adjacent side by side positions, the tools being disposed along a common row. The unit also employs a like plurality of chassis, each chassis being secured to the rear face of a corresponding one of the magazines adjacent a corresponding one of the two opposite ends thereof. All of the chassis engage the chassis engaging means to suspend the magazines in parallel abutting position on the frame.

The chassis engaging means can include a first rail along which the chassis are slidale.

The unit can also include an additional like plurality of chassis, each additional chassis being secured to the rear face of a corresponding one of the magazines adjacent the corresponding other of the two opposite ends thereof. The chassis engaging means can also a second rail parallel to the first rail, the additional chassis being slidable along the second rail.

The unit can also include locking means having a first locked position at which the magazines are locked in place so that each of the chassis and additional chassis cannot slide along the corresponding rail, the locking means having a second unlocked position at which each of the chassis and additional chassis are free to slide along the corresponding rail.

Thus, the magazines can be locked in position while the unit is moved from place to place and, once the unit is in position, the magazines can be unlocked and slid along the rails for removal or replacement as desired.

The foregoing as well as additional objects and advantages of the invention will either be explained or will become apparent to those skilled in the art when this specification is read in conjunction with the brief description of the drawings and the detailed description of preferred embodiments which follow.

DETAILED DESCRIPTION OF THE PREFERRED EMBODIMENTS

Figures 1, 2:
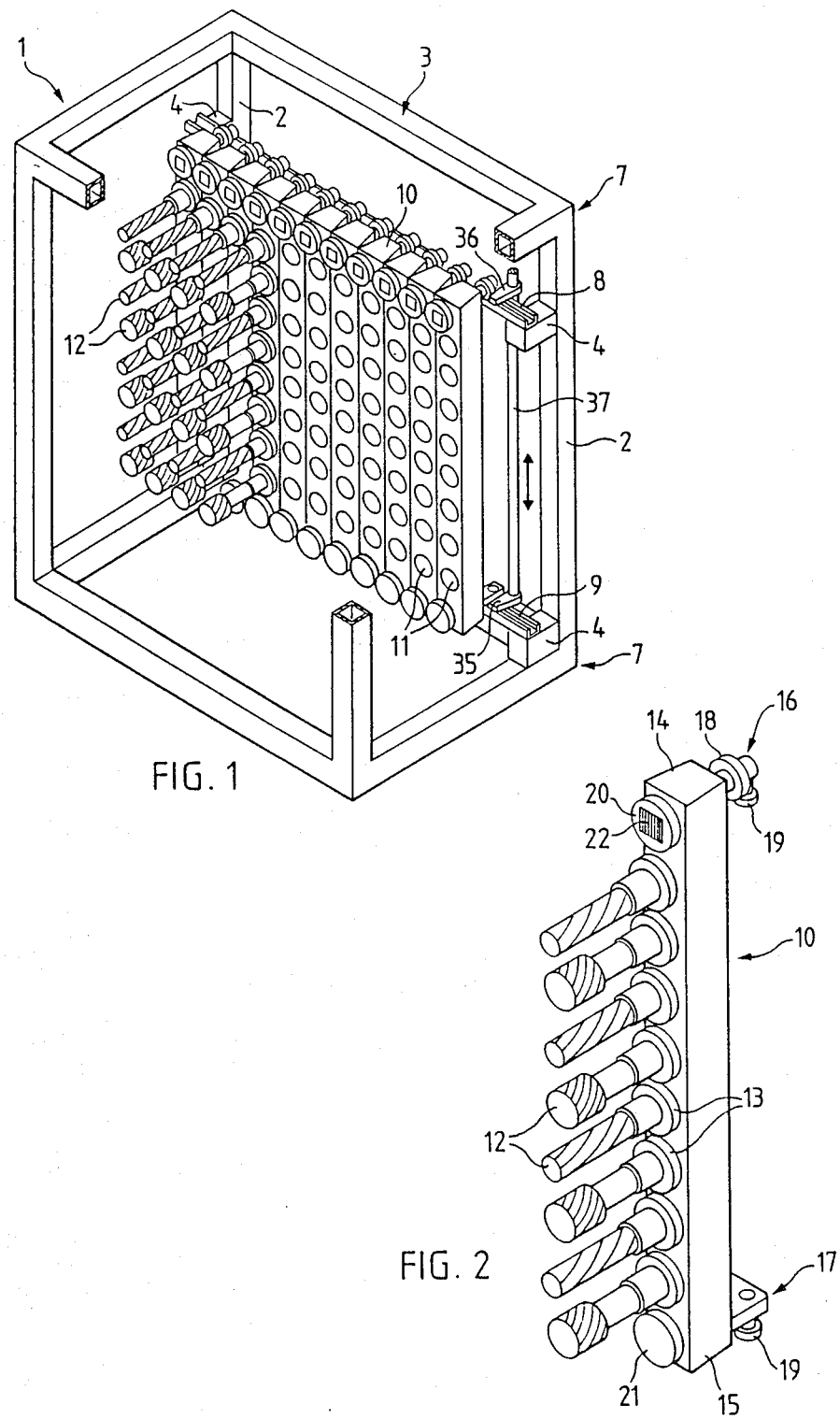
FIG. 1 is a perspective view of a storage and transportation unit in accordance with the invention wherein tool magazines with machining tools are positioned within the unit.
FIG. 2 is a perspective view of a tool magazine in which a row of tools is stored.

The storage and transportation unit shown in FIG. 1 essentially comprises a frame rack 1, which is formed from bars 2, e.g. square pipes, which are interconnected, e.g. by welding. On one of the frames 3 forming the frame rack 1, supports 4 are fixed to the inside of the two parallel bars 2. Two opposite supports 4 are fixed in spaced manner with respect to a joint 7, while the other two supports 4 are directly adjacent to joint 7. The pair of supports arranged in spaced manner with respect to joint 7 carries a first track 8, and the other support pair at joint 7 carries a second track 9. The first and second tracks 8, 9 can be constructed as to have the shape of a U in cross section. Tool magazines 10 are supported in tracks 8, 9, as described in detail relative to FIG. 2.

The tool magazine 10 shown in FIG. 2 is constructed as an elongated case, which has a front face containing a plurality of juxtaposed openings 11, cf. FIG. 1, which are constructed as a positive receptacle for tools 12, which are mainly assembled with tool holders 13. On the opposite (rear) side remote from tools 12, chassis 16, 17 are positioned on the ends 14, 15 of tool magazine 10. Chassis 16 has a runner 18 and a runner guide 19, e.g. with a single or tandem guide runner, while chassis 17 only has runner guide 19. Tool magazine 10 is consequently suspended with the chassis 16, 17 on tracks 8, 9 and is consequently slidable therealong.

At ends 14, 15 of tool magazine 10 on the front face are located tool-side gripping disks 20, 21, with which the tool magazines 10 can be gripped and displaced by the loading and unloading mechanisms. The front surface of gripping disks 20, 21 can be used as supports or carriers for the data codes of the tools of a tool magazine 10 and the destination thereof. For this purpose, a code carrier 22 is fixed to the front face of gripping disk 20 in FIG. 2.

According to FIG. 1, the tool magazines 10 are vertically juxtaposed with their chassis 16, 17 in tracks 8, 9, which are appropriately downwardly inclined with respect to the loading and unloading side. The magazines can be locked in fixed position during transportation. This arrangement of the tool magazines 10 makes it possible to store and transport the frame racks 1 in such a way that, as required, they are positioned vertically or horizontally. The tool magazines 10 are locked in position by means of retaining pawls 35, 36, which are fixed to a lifting rod 37 and can be operated manually or by means of a lifting mechanism, the latter e.g. being associated with a loading and unloading mechanism. However, fixed can also take place in some other way, e.g. by using locking bolts or fixing rods. When the pawls are unlocked, the magazines can be slid along the rails as desired.

Figure 3:
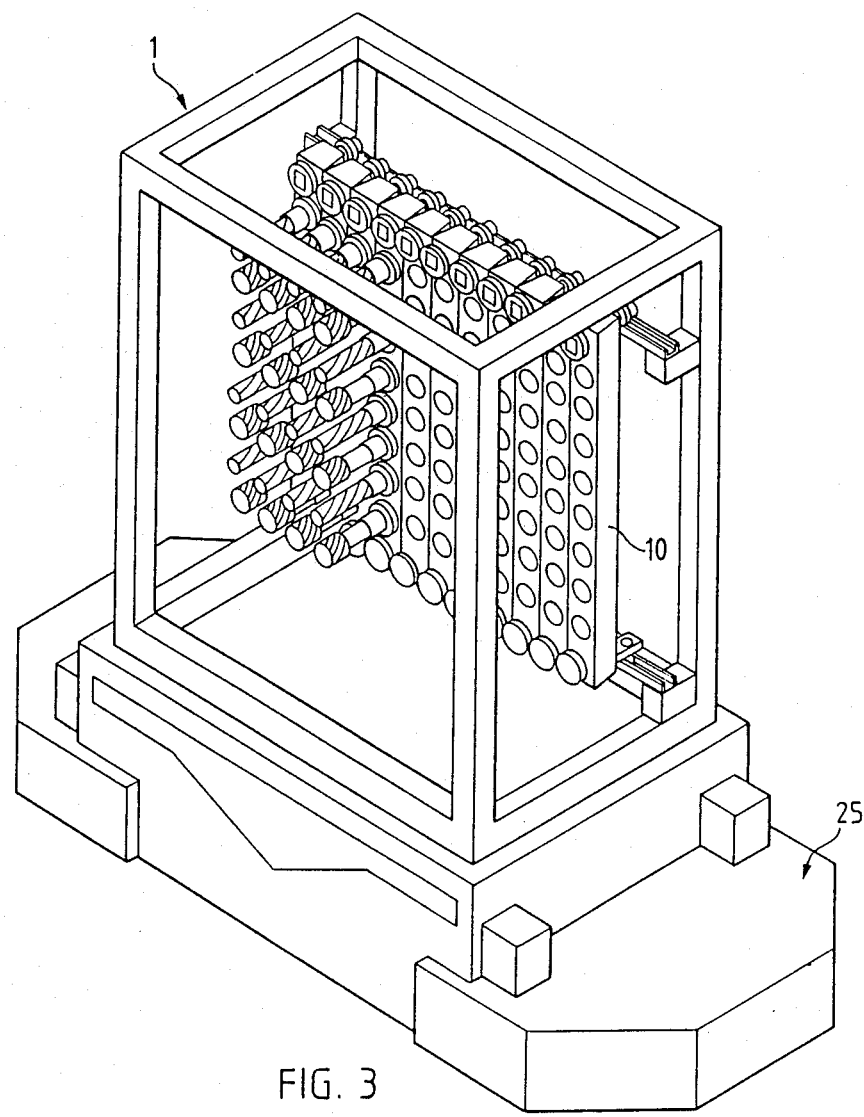
FIG. 3 is a view similar to FIG. 1 but which incorporates a support.

In FIG. 3 the frame rack 1 is loaded with tool magazines 10 and is provided with a transportation support 25 for transportation purposes. Transportation support 25 can have different constructions.

FIG. 3 shows the frame rack 1 with vertically suspended tool magazines 10 on transportation support 25 and fixedly connected thereto. The transportation support can e.g. have runners (not visible), by means of which the frame rack I can be moved along rails. Transportation support 25 can also be a pallet, e.g. a known standard pallet, which carries the frame rack 1 and by means of which the latter can be transported by an industrial truck, e.g. a fork lift truck and can be loaded and unloaded at transfer points. It is also possible to use for this purpose cranes, bogies and tracked vehicles.

Figure 4:
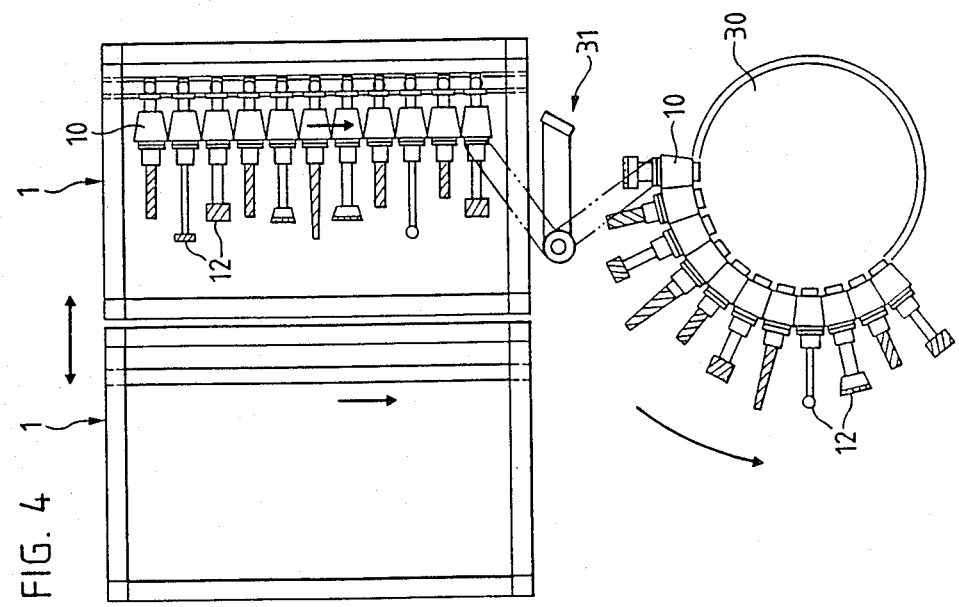
FIG. 4 is plan view illustrating the loading of a store of machine tool from the storage and transportation unit shown in FIG. 1.
Figure 5:
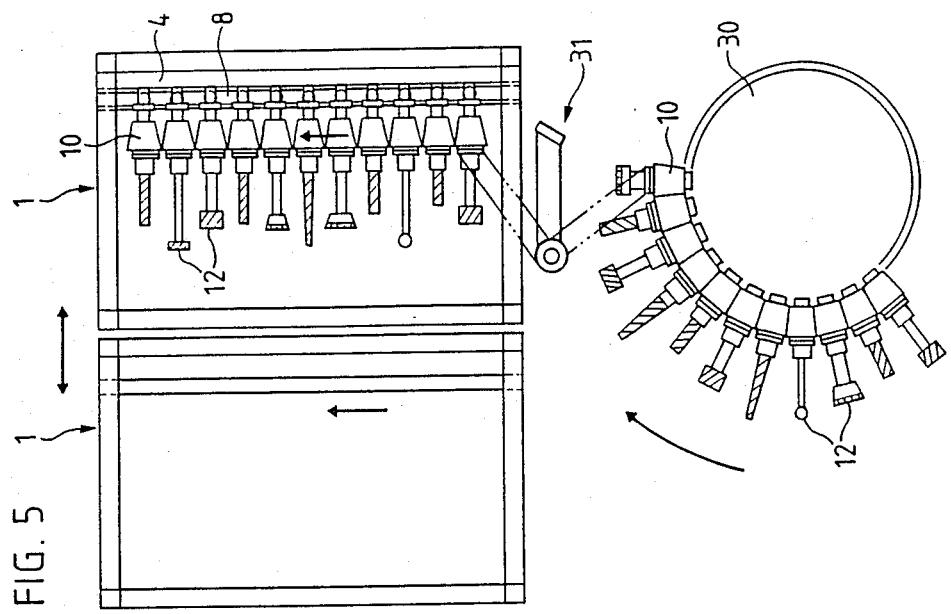
FIG. 5 is a plan view similar to FIG. 4 but illustrating the unloading of a tool store of a machine tool into the storage and transportation unit shown in FIG. 1.

FIGS. 4 and 5 show the transfer of tool magazines 10 from a frame rack 1 into a tool store 30 and the transfer back of tool magazines 10 from the same into the frame rack 1.

FIG. 4 shows the loading of the tool store 30, as described in the aforementioned patent, with a plurality of tool magazines 10 containing tools 12. For this purpose the same number of frame racks 1 are brought to the tool store 30 as tool magazines 10 are required in the latter. The tool magazines 10 are removed magazine wise from the frame rack 1 by means of a transfer mechanism 31 and are transferred to store 30. In FIG. 4 the tool magazines 10 of a first frame rack 1 have been transferred onto the store, so that now the transfer mechanism 31 can take the tool magazines 10 from the next frame rack 1 and transfer them to the tool store 30. The return of the tool magazines 10 into frame racks 1 by transfer mechanism 31 takes place in a similar manner.

In FIG. 5 a frame rack 1 is already loaded with returned tool magazines 10, and can then be moved away to provide space for the next empty frame rack 1, so that through the transfer mechanism 31 the remaining tool magazines 10 can be returned. However, it is also possible to only selectively return the tool magazines with used tools in the frame rack I through the transfer mechanism 31.

During the transfer and return of the tool magazines 10, the advantage of using said magazines becomes particularly clear. The loading of the tool store 30 can take place in a very short time and nevertheless a large number of tools 12 is made available.

The described storage and transportation unit comprising the frame rack and tool magazines 10 constitutes a very flexible solution for making available and transporting tools and can be adapted to the most varied conditions. The storage and transportation units can be used throughout the entire tool cycle during which all the operations necessary for the use of the tools can be performed. Coding of the tools can also be simplified by the tool magazines 10, in which the tools 12 are positively held.

Figure 6:
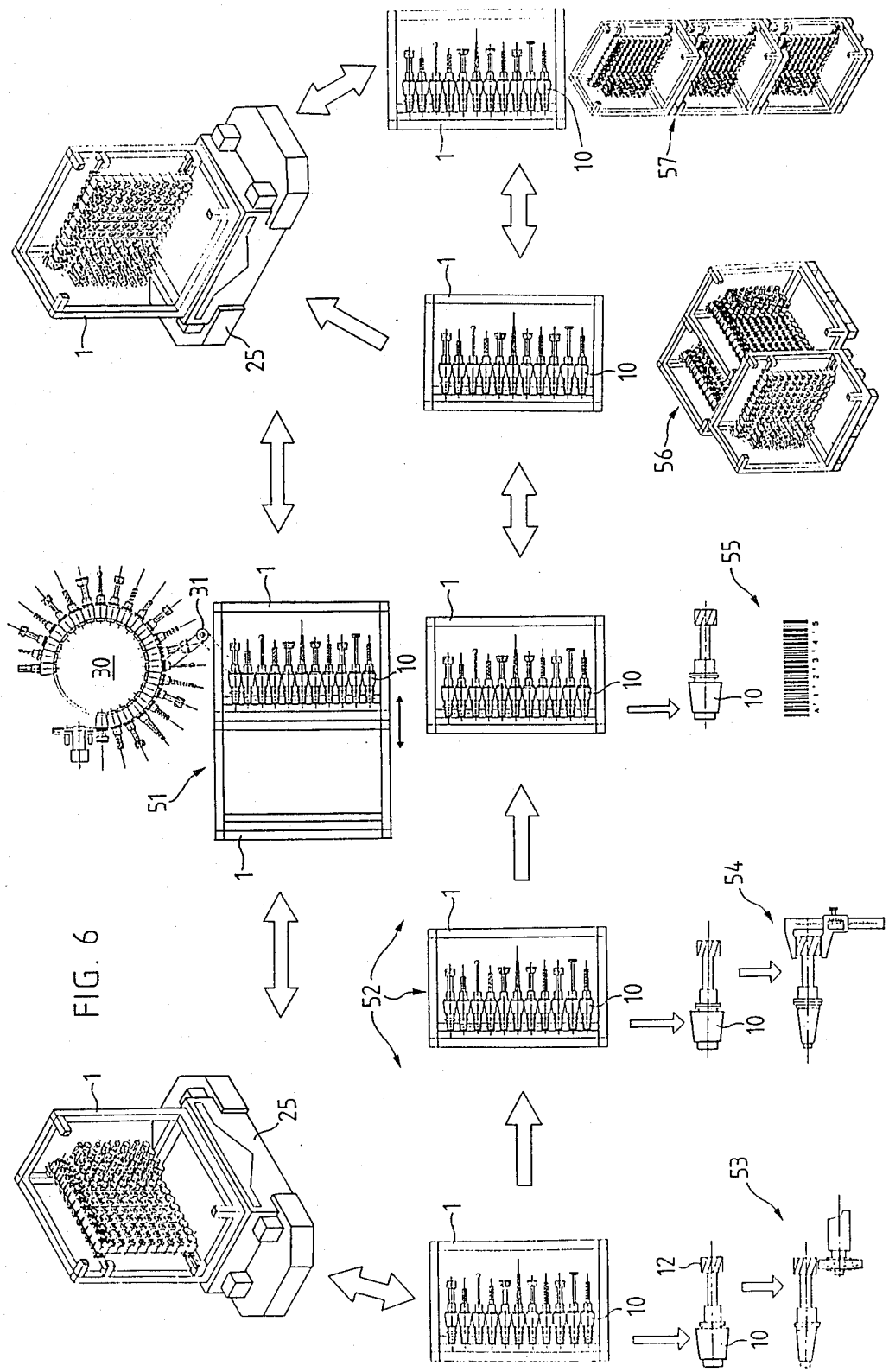
FIG. 6 illustrates diagrammatically a tool circuit using the storage and transportation units of FIG. 1.

The circuit for machining tools of machine tools shown in FIG. 6 shows an application for use of the storage and transportation unit, 51 being the station for a machine tool. It comprises the tool store 30 of the machine tool with the loading and unloading mechanism 31. The two frame racks 1 serve as a support and an additional store for the tool magazines 10.

The storage and transportation unit with a frame rack 1 and transportation means 25, e.g. a truck, is moved to station 52, where resharpening, presetting, coding and bring together of the tools take place.

In the sharpening means 53 the tools 12 are individually removed from the tool magazines 10, resharpened and returned into the magazine 10. The latter is given a new coding and is subsequently loaded into the frame rack.

As the tool magazines 10 have their own chassis, they can be suspended on a rail and transported in this way through station 52. They can optionally easily be pivoted into the horizontal position.

At the presetting station 54, the resharpened tools are preset to the desired value, but can also be preset for a new tool set. The preset tools are directly loaded into a tool magazine 10 and are grouped in a frame rack 1.

In the coding station 55, the tools are marked and it is possible to use various, known codes.

Following coding, the tools are brought together, being grouped in the frame racks 1. The tools can not only be randomly arranged within the magazines, but also the magazines can be given a varying order within the frame rack. The association in frame rack 1 is given by the corresponding space occupancy in the tool store 30. Thus, an access optimization can be achieved at the time of making ready. After leaving station 52, it is possible to carry out the return transport 58 of the storage and transportation units. However, these units can also be used for forming a buffer store 56, which is possible through the dense or tight arrangement of the tools in the frame racks 1. The storage and transportation units can also be stacked in a store 57. For a long-term storage, the tool magazines 10 can be stored in a store in the same way as in the frame racks 1 on correspondingly long tracks 8, 9.

The frame racks 1 can be constructed with external tracks 8, 9. This construction is particularly appropriate in connection with the storage of tools in stationery tool stores. The frame racks according to FIG. 1 are particularly suitable for transportation purposes, because they protect the tools. The frame racks can also be stacked together with pallets and the tool magazines 10 can be positioned both vertically and horizontally.

While the invention has been described with detailed reference to the drawings, it will be obvious to those skilled in the art that many modifications and changes can be made within the scope and sphere of the invention as defined in the claims which follow.

What is claimed is:

1. A mobile storage and transportation unit for machine tools, said unit comprising:
   a frame rack having at least one frame, said frame being provided with chassis engaging means including rails;
   a plurality of elongated tool storage magazines, each magazine having an elongated front face and an opposite elongated rear face and having opposite ends, the front face of each magazine being adapted to removably receive and store a plurality of tools in adjacent side by side positions, the tools being disposed along a common row; and
   , a like plurality of chassis, each chassis being secured to the rear face of a corresponding one of the magazines adjacent a corresponding one of the two opposite ends thereof, all of the chassis engaging the chassis engaging means to suspend the magazines in parallel abutting position on the frame, said magazines being adapted to be loaded onto and removed from the rails at one set of ends thereof, the rails being inclined downwardly toward the one set of rail ends.

2. The unit of claim 1 wherein the frame lies in a plane, the plane being adapted to be positioned either horizontally or vertically.

3. The unit of claim 2 wherein the chassis engaging means includes a first rail along which the chassis are slidable.

4. The unit of claim 3 including an additional like plurality of chassis, each additional chassis being secured to the rear face of a corresponding one of the magazine adjacent the corresponding other of the two opposite ends thereof, the chassis engaging means including a second rail parallel to the first rail, the additional chassis being slidable alone the second rail.

5. The unit of claim 4 further including locking means having a first locked position at which the magazines are locked in place so that each of the chassis and additional chassis cannot slide along the corresponding rail, the locking means having a second unlocked position at which each of the chassis and additional chassis are free to slide along the corresponding rail.

6. The unit of claim 1, wherein the frame rack includes a plurality of frames which are constructed from horizontally elongated and vertically elongated bar like members secured to each other at their ends.

7. A mobile storage and transportation unit for machine tools, said unit comprising:
   a frame rack having at least one frame, said frame being provided with chassis engaging means including rails having two sets of ends;
   a plurality of elongated tool storage magazines, each magazines having an elongated front face and an opposite elongated rear face and having opposite ends, the front face of each magazine being adapted to removably receive and store a plurality of tools in adjacent side by side positions, the tools being disposed along a common row;
   a like plurality of chassis, each chassis being secured to the rear face of a corresponding one of the magazines adjacent a corresponding one of the two opposite ends thereof, all of the chassis engaging the chassis engaging means to suspend the magazines in parallel abutting position on the frame; and
   means for loading the magazines together with the chassis onto and removing the magazines with the chassis from the rails at one set of ends thereof.

8. The unit of claim 1 which is adapted to cooperate with a tool store, the store having a loading and unloading mechanism for transferring tool magazines from the frame to the store and from the store back to the frame.

9. The unit of claim 1 further including a movable support which enables the rack to the connected to a high speed coupling.

10. The unit of claim 1 which can be used as an additional store by a tool store which uses the same tools and tool magazines as carried by the unit.

11. The unit of claim 7, which can be used as an additional store by a tool store which uses the same tools and tool magazines as carried by the unit.

12. The unit of claim 7, wherein the rails are inclined downwardly toward the one set of rail ends.

13. The unit of claim 7, wherein the chassis engaging means includes a first rail along which the chassis are slidable.

14. The unit of claim 13, and further including an additional like plurality of chassis, each additional chassis being secured to the rear face of a corresponding one of the magazines adjacent the corresponding other of the two opposite ends thereof, the chassis engaging means including a second rail parallel to the first rail, the additional chassis being slidable along the second rail.

15. The unit of claim 14, and further including locking means having a first locked position at which the magazines are locked in place so that each of the chassis and additional chassis cannot slide along the corresponding rail, the locking means having a second unlocked position at which each of the chassis and additional chassis are free to slide along the corresponding rail.

16. The unit of claim 7, wherein the frame rack includes a plurality of frame which are constructed from horizontally elongated and vertically elongated bar like members secured to each other at their ends.

17. The unit of claim 7, which is adapted to cooperate with a tool store, the store having a loading and unloading mechanism for transferring tool magazines from the frame to the store and from the store back to the frame.

18. The unit of claim 7, and further including a movable support which enables the rack to be connected to a high speed coupling.

* * * * *